United States Patent
Hakalin et al.

(10) Patent No.: US 6,584,318 B2
(45) Date of Patent: Jun. 24, 2003

(54) METHOD FOR DIVIDING TRAFFIC IN A CELLULAR RADIO NETWORK

(75) Inventors: Petteri Hakalin, Oulu (FI); Jari Hulkkonen, Oulu (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/943,736

(22) Filed: Sep. 4, 2001

(65) Prior Publication Data

US 2002/0042276 A1 Apr. 11, 2002

Related U.S. Application Data

(63) Continuation of application No. PCT/FI00/00170, filed on Mar. 3, 2000.

(30) Foreign Application Priority Data

Mar. 5, 1999 (FI) .................................................. 990488

(51) Int. Cl.[7] .................................................. H04Q 7/36
(52) U.S. Cl. ........................ 455/453; 455/436; 455/446
(58) Field of Search ................................ 455/446, 447, 455/449, 450, 451, 452, 453, 436, 67.1, 67.3, 422, 63

(56) References Cited

U.S. PATENT DOCUMENTS

| 5,179,722 A | 1/1993 | Gunmar et al. |
| 5,241,685 A | 8/1993 | Bodin et al. |
| 5,455,967 A | * 10/1995 | Amezawa et al. ............ 455/69 |

FOREIGN PATENT DOCUMENTS

| EP | 615 395 | 9/1994 |
| GB | 2 311 191 | 9/1997 |
| WO | WO 00/28758 | 5/2000 |

* cited by examiner

Primary Examiner—Lee Nguyen
(74) Attorney, Agent, or Firm—Pillsbury Winthrop LLP

(57) ABSTRACT

The invention relates to a method for dividing traffic between cells and a cellular radio system comprising at least a base station (300) of a particular cell (304), at least one subscriber terminal (322, 324) communicating with the base station (300), and cells (306) surrounding the particular cell (304), and subscriber terminals (332, 334) communicating therewith, the cellular radio system being arranged to measure the amount of traffic and interference in the system, and to calculate a weighting value for each cell based on the network measurements. In the method of the invention the base station (300) of the particular cell is arranged to adjust the size of its coverage area on the basis of the weighting value of the cell (304).

10 Claims, 4 Drawing Sheets

METHOD FOR DIVIDING TRAFFIC IN A CELLULAR RADIO NETWORK

This application is a Continuation of International Application PCT/FI00/00170 filed Mar. 3, 2000, which designated the U.S. and was published under PCT Article 21(2) in English.

FIELD OF THE INVENTION

The invention relates to a cellular radio network and a method for dividing traffic into different cells in the cellular radio network.

BACKGROUND OF THE INVENTION

One of the key problems when constructing and maintaining cellular radio networks is the limited scope of the available radio spectrum. The aim is to minimize interference caused by a co-channel signal and an adjacent channel signal by carefully planning the use of radio frequencies. The frequencies are divided according to various complex models into different cells with the intention to minimize the interference occurring on the radio connections, thus maximizing the network capacity. In the same or adjacent repetition pattern of a cell, the frequencies cannot be too close to each other, because this causes excessive interference to the system. As the use of mobile phones and other subscriber terminals becomes more common, the capacity of networks must continuously be increased. This incurs high costs in frequency planning and various measurements.

A strict repetition pattern of frequencies causes in current networks, such as the GSM network, the network capacity to be interference limited. Consequently the interference level of the network, and therefore the number of disconnected connections, increases significantly, when the network load exceeds a particular threshold. The capacity of an interference limited network can be maximized if the interference can be equally divided into different cells of the network. In an optimal situation, no good, intermediate or poor quality signals exist, but all connections are "good enough".

A known method for dividing traffic as well as interference in a network is handovers, which are performed on account of the traffic (TrHO, Traffic reason Handover). In such a case, a number of terminals is controlled to perform handover from a loaded cell to an adjacent less loaded cell. This is illustrated in FIG. 1. FIG. 1 shows a set of cellular radio system cells 100 to 106. The intermediate cell 100 is heavily loaded but the surrounding cells 102 to 106 include less traffic. Then some of the terminals 108 to 114 of the cell can be directed to perform handover to a stronger neighbouring cell including capacity.

Another known method to balance interference in the system is a dynamic Hot Spot method (DHS, Dynamic Hot Spot). This is illustrated in FIG. 2. FIG. 2 shows a set of cells 200 to 206 in the cellular radio system. Always when a need arises in the network to perform either handover or allocation of a new call, the frequencies used in various cells are checked, and how the cell, into which handover is made or in which a new call is formed, interferes with the surrounding cells using the same frequency. In the example shown in FIG. 2, a new call 208 is to be established in the cell 200 to a terminal 210. It is observed that the cells 202 and 204 use the same frequencies. In this case the interference caused by the cell 200 is checked in the cells 202 and 204. If the cell 200 causes a significant amount of interference to said cells and the connection quality in these cells 202 and 204 is poor, permission for a new connection is not granted. The basic idea is thus that when the load of a particular cell exceeds a predetermined value and the interference in the rest of the cellular radio network therefore increases, then so-called soft blocking can be used in channel allocation, i.e. the channel is not implemented due to the increased amount of interference even if it were available. The blocking criterion is checked in each new call allocation and inter-cell handover.

Prior art methods have, however, several drawbacks. The handovers performed on the basis of traffic tend to move traffic from a loaded cell into less loaded cells. Then channels are released from the loaded cells. In an interference limited network, on account of the strict frequency pattern, the problem is not the number of free channels but the cell quality, which varies significantly, and is caused by the amount of interference in the co-channel sent by an interfering cell (interfering cells) and the location of the mobile stations of said cells (the radio path between the base station and the mobile station). For example, if the connection of the terminal includes a strong specific signal, an interfering signal may also be strong, whereas the connection including a weak specific signal, cannot allow a lot of interference. In an interference limited network the interference should be divided in such a manner that the cells, in which the connection quality is good can be allowed more co-channel interference, and the cells, in which the connection quality is poor should reduce co-channel interference. Hence, interference is not necessarily balanced (to correspond in numbers) in each cell but divided in accordance with the situation (based on measurements) between the cells. However, the TrHO method does not take into account the interference caused by the target cell to the surrounding cells when performing handover. If the interfered cells on every connection are of good quality, handovers need not be performed from an interfering cell having a heavy traffic load. Because, even if the target cell had a smaller traffic load, the interference thereof may cause poorer connection qualities to the surrounding co-channel cells. The TrHO method is therefore not very efficient.

In the DHS method the number of new calls and handovers to be accepted in the cell is restricted on the basis of the interference caused by the cell. When adjacent cells overlap considerably, the rejection of handovers does not necessarily become a problem, but if terminals move rapidly and the coverage areas of the adjacent cells do not overlap considerably, then the rejection of handover may result in a disconnected call. This occurs in particular if a terminal moves towards a cell that interferes with other cells. Then, although the terminal connection to the base station thereof fades, it cannot perform handover to a new cell interfering with the others, and then the call is disconnected. Therefore, the DHS method rather restricts the creation of interferences than balances the interferences to different cells.

BRIEF DESCRIPTION OF THE INVENTION

It is an object of the invention to provide a method allowing to divide interference to different cells avoiding the above problems. This is achieved by the method of the invention for dividing traffic between cells in a cellular radio network, where a weighting value based on network measurements is calculated for each cell. In the method of the invention the size of each cell is adjusted on the basis of the weighting value calculated for the cell.

The invention also relates to a cellular radio system comprising at least a base station of a particular cell, at least one subscriber terminal communicating with the base station, and cells surrounding the particular cell, and subscriber terminals communicating therewith, and the cellular radio system being arranged to measure the amount of traffic and interference in the system, and to calculate a weighting value for each cell on the basis of the network measurements. In the system of the invention the base station of the particular cell is arranged to adjust the size of its coverage area on the basis of the weighting value of the cell.

The preferred embodiments of the invention are disclosed in the dependent claims.

Several advantages are achieved with the solution of the invention. In a preferred embodiment of the invention the size of the cell is adjusted by dynamically changing the handover margin of the cell in relation to the surrounding cells. On this account the terminals in the border area between the cells can preferably be directed to the best cell as regards interferences. The invention allows to avoid calls to be disconnected, since handovers are not refused. By adjusting the handover margin the moment for performing handover can be selected so as to minimize interference.

In another preferred embodiment of the invention the handover margin of the cell has a specific base value, and the margin is changed using a correction factor depending on the amount of interference.

In a further embodiment of the invention the solution of the invention is applied together with the DHS method. Then the connections subjected to interferences from the cell are determined on the basis of the measurements of the subscriber terminals located in the neighbouring cells concerning the strongest neighbouring cells, and the frequencies used by the neighbouring cells and common to the cell to be examined. The correction factor of the handover margin depends on the connection quality of each surrounding cell subjected to interference. Then the actual interference can be very accurately estimated and the interference can be balanced between different cells more accurately than before.

BRIEF DESCRIPTION OF THE DRAWINGS

In the following the invention will be described in greater detail by means of the preferred embodiments with reference to the attached drawings, in which.

DETAILED DESCRIPTION OF THE INVENTION

Figure 1:
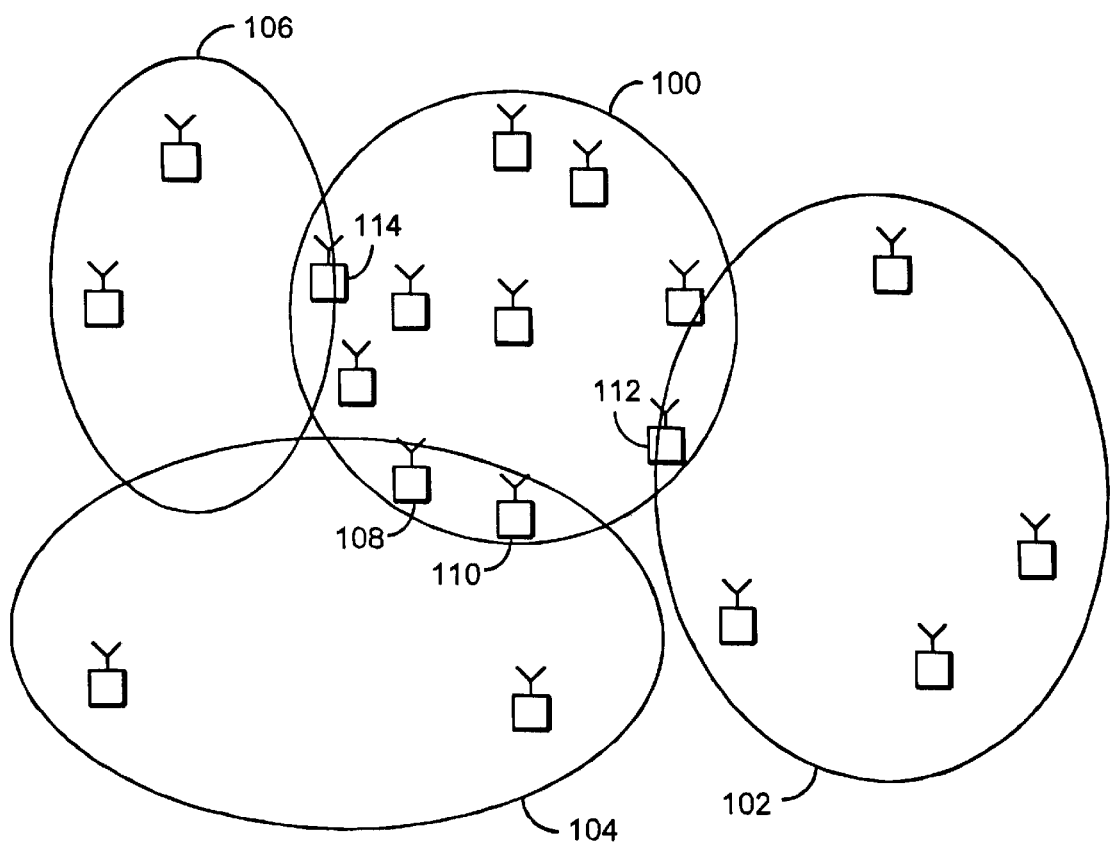
FIG. 1 shows the example described above of a handover performed on the basis of traffic.
Figure 2:
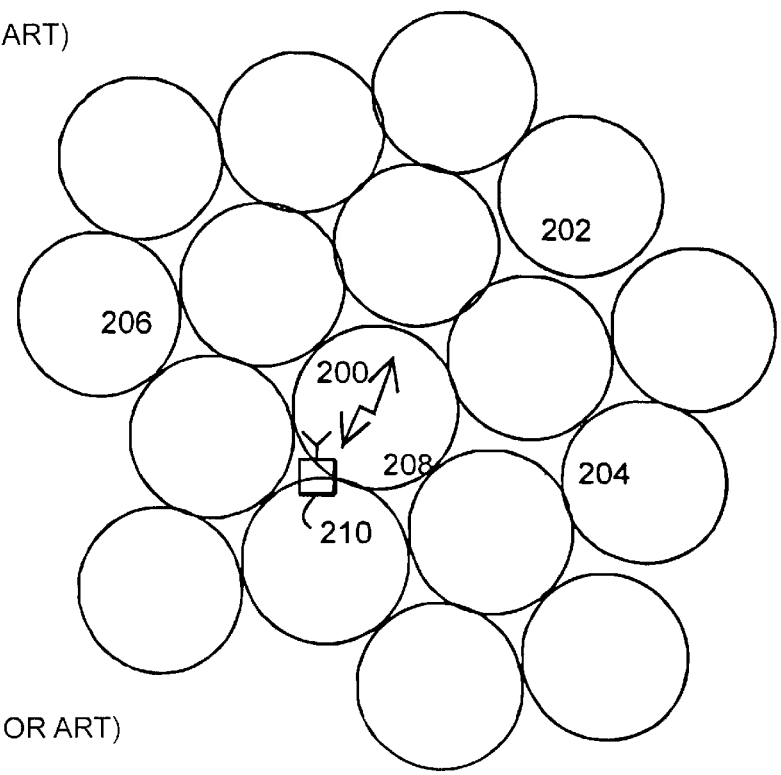
FIG. 2 shows the example described above of the DHS method.
Figure 3:
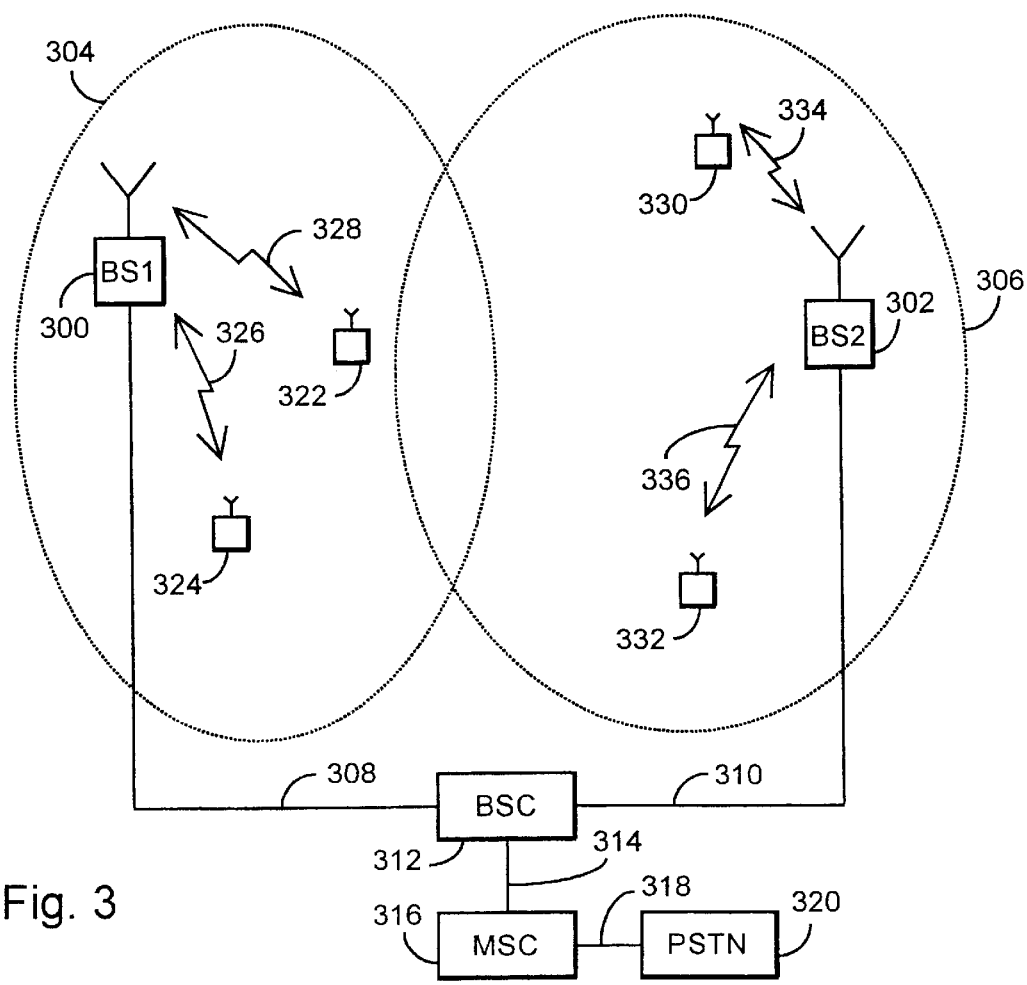
FIG. 3 shows an example of a cellular radio system in which the invention can be implemented.

FIG. 3 shows an example of the structure of a cellular radio system. The Figure shows two adjacent base stations 300, 302 of the system and their coverage areas, or cells, 304, 306. The base stations 300, 302 communicate through connecting links 308, 310 with a base station controller 312. The aim of the base station controller 312 is to control the operation of its subordinate base stations. In general, the base station controller 312 has a connection 314 to a mobile services switching centre 316, and from there a further connection 318 to a fixed telephone network 320. In office systems, the functions of the base station 300, the base station controller 312 and even the mobile services switching centre 316 can be combined to one apparatus, which communicates with the fixed network 320, for example with a telephone exchange of the fixed network 320. Subscriber terminals 322, 324 in the cell 304 have a bi-directional radio connection 326, 328 to the base station 300 of the cell. Subscriber terminals 330, 332 in the cell 306 have a bi-directional radio connection 334, 336 to the base station 302 of the cell. In addition, a network part, or a fixed part of the cellular radio network, may comprise additional base stations, base station controllers, transmission systems and network management systems of different levels. It is obvious for those skilled in the art that the cellular radio network also comprises a variety of other structures, which need not be explained in greater detail in this context.

In cellular radio systems, when the terminals are in motion, a need occasionally arises to perform handover from one base station to another in order not to disconnect the connection. Let us take a closer look at the terminal 322, which moves in the coverage area 304 of the base station 300 towards the coverage area 306 of the base station 302. The terminal communicates with the base station 300, but as the distance increases the quality of the connection and the signal strength decreases. If handover to the subordinates of another base station 302 was not performed, the ongoing connection would evidently be disconnected. In order not to create handovers back and forth from one base station to another, i.e. a so-called ping-pong phenomenon, on the border of the coverage areas of the base stations, the systems generally use a handover margin.

Figure 4:
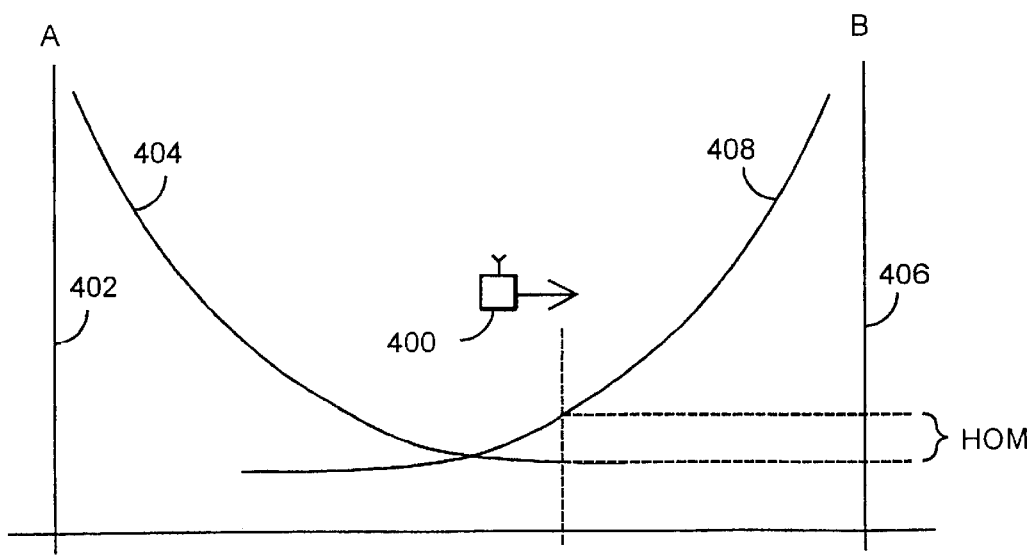
FIG. 4 illustrates a handover margin.

FIG. 4 illustrates the handover margin. Let us assume that a terminal 400 in cell A is moving towards cell B. In the Figure, an axis 402 on the left shows a signal strength 404 of the base station in cell A received by the terminal 400. An axis 406 on the right of the Figure shows a signal strength 408 of the base station in cell B received by the terminal 400. As the terminal moves towards cell B the signal strength of the base station in cell B increases and gradually exceeds the signal strength of the base station in cell A. However, the terminal does not perform handover to cell B before the signal strength 408 of the base station in cell B exceeds the signal strength 404 of the base station in cell B by a particular threshold HOM.

In the solution of the invention the interferences in a cellular radio system are balanced between the different cells so as to adjust the size of each cell on the basis of the inteference caused to the surrounding cells by the cell. This can preferably be implemented by dynamically adjusting the handover margin of the cell in relation to the surrounding cells. The handover margin of the cell interfering with the surrounding cells is increased for the calls arriving at the cell and reduced for the calls leaving the cell. The terminals at the edges of the cell move more easily than before to the surrounding cells and the terminals at the edges of the adjacent cells remain longer in the original cell before attempting a handover to an interfering cell.

The handover margin can preferably be adjusted, for example, using a correction factor which is dynamically calculated on the basis of the interferences. The correction factor can be calculated for each surrounding cell individually and the dynamic handover margin DHOM is obtained, for example, using the following formula:

$$DHOM = HOM - CF_{BS1} + CF_{BS2} \quad (1)$$

where

HOM=the basic value of the handover margin $CF_{BS1}$=the correction factor of a serving cell and $CF_{BS2}$=the correction factor of an adjacent cell.

In this case the hanover margin can be scaled for a particular interval in accordance with the following formula:

$$HOM - CF < DHOM < HOM + CF, \quad (2)$$

where CF is a correction factor.

The above formula 2 shows that the handover margin can easily be provided with certain minimum and maximum values, within which the handover margin should remain.

Figure 5:
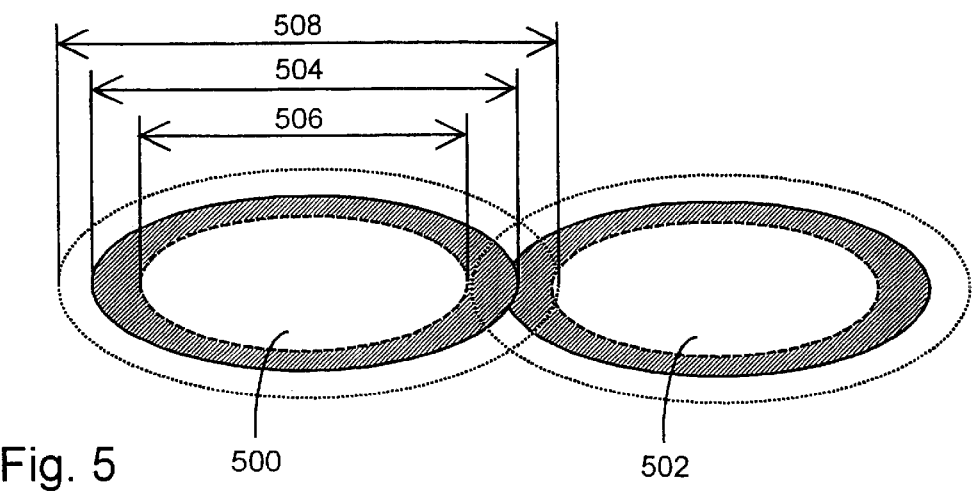
FIG. 5 illustrates how the handover margin affects the size of a cell.

FIG. 5 illustrates how the handover margin affects the size of the cell. The Figure shows two adjacent cells 500, 502. The size of the cell 500 at the basic value of the handover margin is indicated in the Figure by a shaded ellipse 504. The size of the cell 500 is reduced to cover the area indicated by a dashed line 506 by the preferable minimum value of the handover margin. This means that the minimum value of the handover margin allows the terminals to communicate with the base station of the cell 500 while remaining within the area 506. When the terminals move towards the edge of the area 506 they request a handover to a surrounding cell. Correspondingly the size of the cell 500 increases to cover the area indicated by a dashed line 508 by the preferable maximum value of the handover margin. This means that the maximum value of the handover margin allows the terminals to communicate with the base station of the cell 500 while remaining within the area 508. When the terminals move towards the edge of the area 508, they request a handover to a surrounding cell.

The solution of the invention can preferably be applied also in connection with a dynamic hot spot method. The advantage being that the interferences can be estimated directly as well as the amount of interference the interfered cells allow. In this case, the standard practice in cellular radio networks is utilized where the terminals receive the broadcast control channel sent by the base stations and perform the power measurement of said channel. For example, in the GSM system this broadcast control channel is referred to as BCCH. This channel is used for measuring the need for handover and for searching handover candidates. In this method, the surrounding cells using the same frequencies as the cell to be examined are determined at first.

Figure 6:
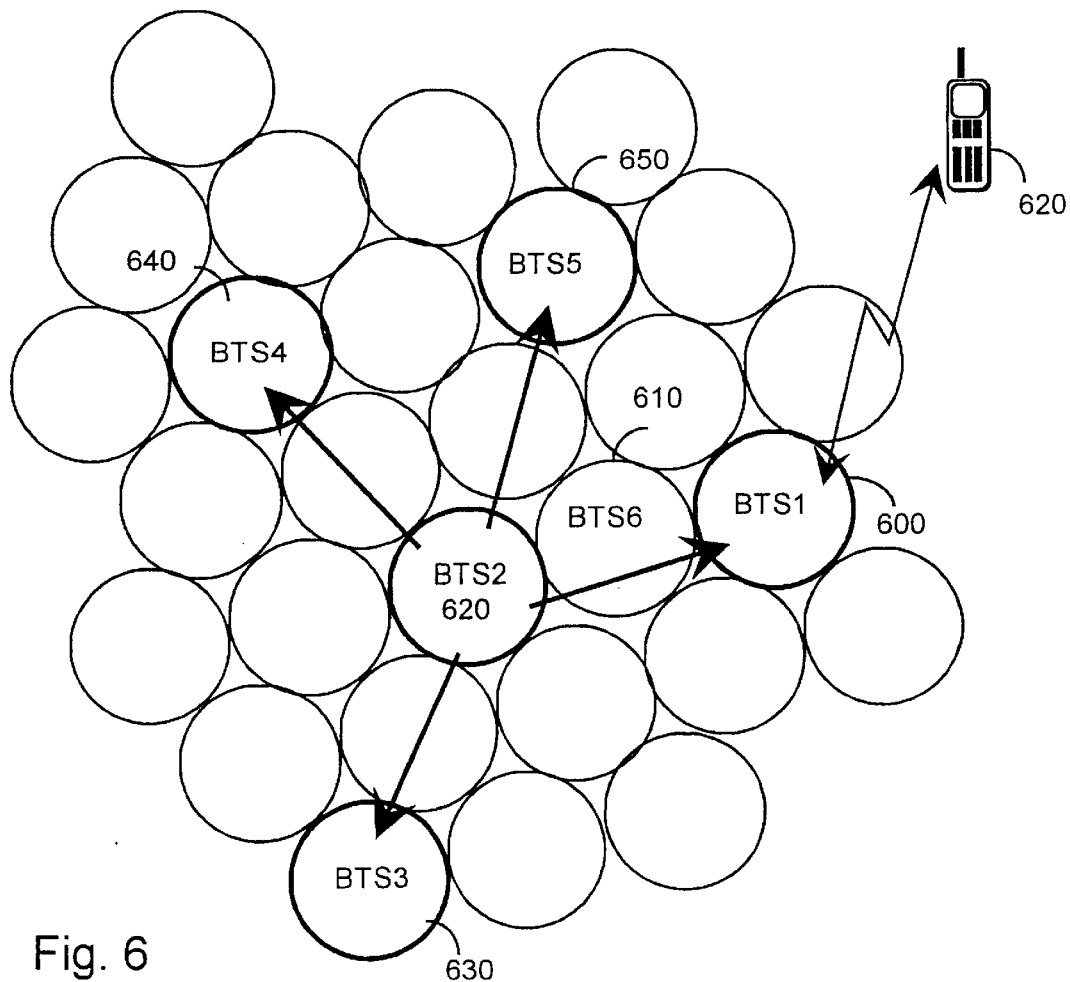
FIG. 6 illustrates how the DHS method is used together with the solution of the invention.

FIG. 6 illustrates this example in more detail. The radio network comprises a set of cells, each one being allocated with a set of frequency bands for subscriber terminal connections. Cells 600, 620, 630, 640, 650 indicated in FIG. 6 use at least partly the same frequency group, i.e. the same frequencies. Let us assume in this example that the frequencies used are cell-specifically as follows:

Cell Frequencies

TABLE 1

| Cell | Frequencies |
| --- | --- |
| 600 | $f_4, f_5, f_6, f_7$ |
| 620 | $f_1, f_2, f_3, f_4, f_5$ |
| 630 | $f_2, f_3, f_4, f_5, f_6$ |
| 640 | $f_5, f_6, f_7, f_8$ |
| 650 | $f_1, f_2, f_3, f_4$ |

Each subscriber terminal having a connection with its base station continuously measures the signals of the broadcast control channels of the strongest neighbouring cells. The terminals in the cells, surrounding the cell 600, also perform measurements. What is essential in this context is the cells using the same frequencies as the cell 600, where a decision has to be made concerning a new connection between a subscriber terminal and a base station.

The method basically includes two steps. First, interference information is gathered from the neighbouring cells 620, 630, 640 and 650 of the cell 600 in the following way. Let us start from the cell 620. The base station controller gathers the BCCH measurement results from the subscriber terminals communicating with said cell 620. Each subscriber terminal independently performs measurements preferably from the six strongest BCCH signals. Said six signals on the terminals located on different sides of the cell can be different. The number of common frequencies between the cell 620 and the reported neighbouring cells is calculated. Next it is established whether the number of common frequencies exceeds zero. If not, then no significant interference occurs between these cells. The adjacent cell 610, for example, uses different frequencies than the cell 620. For this reason the reports on the BCCH signal of the base station will not be omitted in this context, even though several terminals on that side of the cell apparently measure this signal. On the basis of the BCCH measurements performed by the subscriber terminals, the cells having at least one common frequency with the serving cell 620 are tabulated from the strongest neighbouring cells. In this example the cells using the same frequencies are thus 600, 630, 640 and 650. In other words, if the number of common frequencies exceed zero, the table of the neighbouring cells 600, 630, 640 and 650 interfered by the cell 620 is updated. The table indicates, for example, the identifiers of the neighbouring cells 600, 630, 640 and 650 using the same frequencies, the ratio of the common frequencies of the cell 620 and its neighbouring cells, i.e. the same frequencies, and all available frequencies (calculated from the cell 620 and from each neighbouring cell at a time) in said neighbouring cells, and the poor quality samples in proportion to all samples. The table for the cell 620 may be displayed as follows:

TABLE 2

| Cell of the same frequency group | Ratio between the number of common frequencies and all frequencies (Cell 620 + Cell X) TS | Ratio between poor quality samples and all samples PQ %. |
| --- | --- | --- |
| Cell 630 | 4/6 | 2/50 |
| Cell 640 | 1/8 | 3/60 |
| Cell 650 | 4/5 | 20/80 |
| Cell 600 | 2/7 | 7/70 |
| — | — | — |

In the following the poor quality samples in proportion to all samples are indicated with abbreviation PQ %. Similar tables are drawn up for each neighbouring cell 620, 630, 640 and 650 of the cell 600. Thus, in the tabulation an interfering cell indicates a cell, whose BCCH signal is heard among the strongest ones and correspondingly an interfered cell is a cell, whose table is being updated.

In the present invention the percentages PQ % can be utilized when calculating the correction factor of the handover margin.

Let us next determine a connection ratio for each interfered neighbouring cell 620 to 650 by means of the poor quality percentage PQ % calculated in Table 2. This ratio indicates the strength of the interference. The ratio is intended for scaling the quality value for a known interval. The determination of the connection ratio on the basis of the PQ % value can be performed, for example, by means of the following table:

TABLE 3

| Poor quality percentage (PQ %) | Connection ratio |
|---|---|
| PQ % > Poor quality limit value | 0 |
| Poor quality limit value >= PQ % > Signal quality limit value 1 | Prob 1 |
| Signal quality limit value 1 >= PQ % > Signal quality limit value 2 | Prob 2 |
| Signal quality limit value 2 >= PQ % > Good quality limit value | Prob 3 |
| Good quality limit value > PQ % | 1 |

The connection ratio values are determined as follows: if the calculated, so-called excessively poor quality percentage PQ % exceeds the pre-set standard poor quality limit value, the connection ratio in the table is zero. If the measured poor quality percentage PQ % is lower than or equal to the pre-set poor quality limit value and at the same time exceeds the pre-set signal quality limit value 1, the ratio in the table is a constant "Prob 1". If, in turn, the measured poor quality percentage PQ % is lower than or equal to the pre-set signal quality limit value 1 and exceeds the pre-set signal quality limit value 2, the ratio in the table is "Prob 2". Likewise, if the measured poor quality percentage PQ % is lower than or equal to the pre-set signal quality limit value 2 and exceeds the pre-set good quality limit value, the ratio in the table is "Prob 3". If, in turn, the good quality limit value exceeds said poor quality percentage PQ %, the ratio is 1. If necessary, the scale of the table can be changed to be more detailed or less detailed, i.e. the ratio may vary at desired intervals between [0, 1].

The calculated connection ratio can also be utilized when calculating the correction factor of the handover margin. This is illustrated in table 4. In table 4 the connection ratio is indicated in three steps, i.e. the connection ratio comprises values 0, 0.5 and 1, or compared with the previous table, the constant "Prob 1" corresponds with value 0.1 and the constants "Prob2" and "Prob3" are not used.

TABLE 4

| Connection ratio | Correction factor (dB) |
|---|---|
| 0 | 4 |
| 0.5 | 2 |
| 1 | 0 |

Depending on the value of the connection ratio the correction factor obtains the value 4, 2 or 0 dB. Corresponding values can be implemented also when the connection ratio obtains more values than the three indicated. Let us assume, for example, that the connection ratio obtains several values between 0 and 1, for instance 0, 0.1, 0.2 . . . 0.9 and 1, i.e. 0.1 step-wise. Then the correction factor can be determined in accordance with table 5 as follows

TABLE 5

| Connection ratio | Correction factor (dB) |
|---|---|
| ratio = 0 | 4 |
| 0 < ratio <0.5 | 2 |
| ratio > 0.5 | 0 |

Figure 7A:
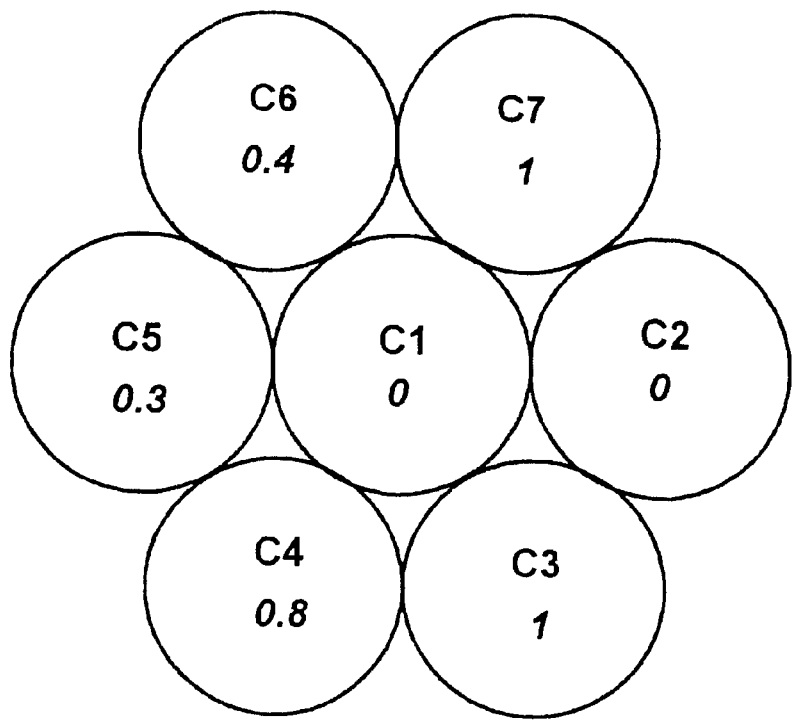
FIGS. 7a and 7b illustrate how the method of the invention is applied.
Figure 7B:
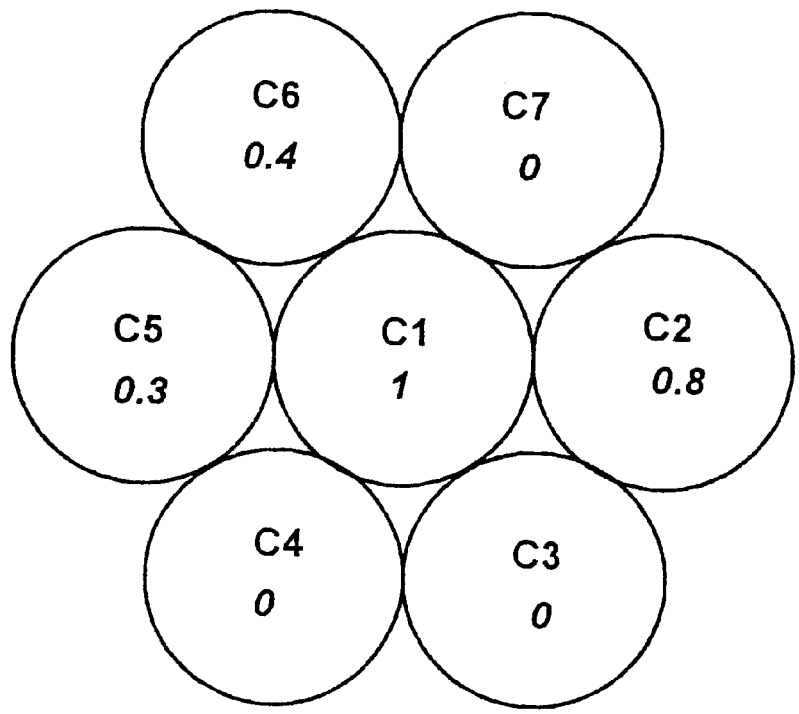

Let us take a closer look at two examples of calculating a dynamic handover margin by means of FIGS. 7a and 7b. It is assumed in both examples that the basic value of the handover margin is 6 dB. It is also assumed that the correction value of the handover margin is set according to table 5. The example in FIG. 7a includes seven cells C1 to C7 and each cell is indicated with a temporary connection ratio calculated for said cell. Let us assume that a terminal is about to move from cell C1 to a surrounding cell. Cell C1 is referred to as a source cell and the cell towards which the terminal is moving as a target cell. Now, when the handover margins DHOM between the cells are calculated using table 5 and formula 1 the following table is obtained:

TABLE 6a

| Source cell | Target cell | DHOM | Formula 1 |
|---|---|---|---|
| C1 | C2 | 6 dB | (6 − 4 + 4) |
| C1 | C3 | 2 dB | (6 − 4 + 0) |
| C1 | C4 | 2 dB | (6 − 4 + 0) |
| C1 | C5 | 4 dB | (6 − 4 + 2) |
| C1 | C6 | 4 dB | (6 − 4 + 2) |
| C1 | C7 | 2 dB | (6 − 4 + 0) |

Table 6a shows that the handover margin DHOM varies between cell C1 and the target cell depending on the target cell, as it depends on the connection ratio of the cells which directly depends on the interference caused by each cell to other cells. For example, the margin between cell C1 and C2 is 6 dB, but between cell C1 and C3 only 2 dB, as the connection ratio indicates that cell C3 is not a very interfering cell to the other cells. Cells C1 and C2 are, in turn, both cells that considerably interfere with the others. The interference would be more equally balanced, if terminals were to move from cell C1 to cell C3, and said handover margin would remain lower, or the handover would take place more easily than to cell C2.

Let us next take a look at the situation according to FIG. 7b. The Figure is the same as FIG. 7a except that the connection ratios of the cells are different. When calculating the handover margins DHOM between the cells, table 5 and formula 1 allow in this case to obtain the following table:

TABLE 6b

| Source cell | Target cell | DHOM | Formula 1 |
|---|---|---|---|
| C1 | C2 | 6 dB | (6 − 0 + 0) |
| C1 | C3 | 10 dB | (6 − 0 + 4) |
| C1 | C4 | 10 dB | (6 − 0 + 4) |
| C1 | C5 | 8 dB | (6 − 0 + 2) |
| C1 | C6 | 8 dB | (6 − 0 + 2) |
| C1 | C7 | 10 dB | (6 − 0 + 4) |

In this situation the source cell, or cell C1, is not an interfering cell, since the connection ratio thereof is 1. All calculated handover margins are fairly high, as it is not sensible to move traffic from a somewhat interfering cell to other less interfereing cells.

The cellular radio system of the invention the base station of the cell is arranged to adjust the size of its coverage area on the basis of the interference caused by the cell (200) to the surrounding cells, and the size is preferably adjusted by dynamically changing the handover margin of the cell in relation to the surrounding cells. The measures required by the invention can preferably be implemented as software, or by means of a signal or general processor, ASIC circuits, separate components or various combinations thereof.

Even though the invention has above been described with reference to the example in the accompanying drawings, it is obvious that the invention is not restricted thereto but can be modified in various ways within the scope of the inventive idea disclosed in the attached claims.

What is claimed is:

1. A method for dividing traffic between cells in a cellular radio network, the method comprising:

calculating for each cell a weighting value based on network measurements, the interference caused by each cell to the surrounding cells and the amount of traffic of each cell;

adjusting the size of each cell based on the weighting value calculated for the cell dynamically by changing the handover margin of the cell in relation to the surrounding cells, wherein the handover margin of the cell has a particular basic value, and the margin is changed with a correction factor depending on the amount of interference.

2. The method of claim 1, further comprising adjusting the handover margin independently for each surrounding cell.

3. The method of claim 1, wherein the handover margin of the cell interfering with the surrounding cells is increased for the calls arriving at the cell and decreased for calls leaving the cell.

4. The method of claim 1, wherein the handover margin is changed within pre-set limits.

5. The method of claim 1, further comprising measuring by a terminal in a determined cell in the cellular radio system the strengths of the broadcast control channels received from the surrounding cells;

reporting by the terminal the results to the base station;

determining the connections interfered by a particular cell of neighbouring cells using at least partly the same frequency set as the particular cell on the basis of the measurements of the subscriber terminals located in the neighbouring cells concerning the strongest neighbouring cells and on the basis of the common frequencies used by the neighbouring cells together with the particular cell and selecting the correction factor of the handover margin on the basis of the quality measurements of the interfered connections of each surrounding cell.

6. The method of claim 5, wherein a connection ratio depending on the quality measurements of the connections interfered by the cell to be examined is determined for the system cell, and the handover margin is adjusted on the basis of the ratio.

7. A cellular radio system comprising at least a base station of a particular cell, at least one subscriber terminal communicating with the base station, and cells surrounding the particular cell, and subscriber terminals communicating therewith, wherein the cellular radio system is arranged to measure the amount of traffic and interference in the system, and to calculate a weighting value for each cell based on the network measurements and depending on the interference caused by each cell to the neighboring cells, the base station of the particular cell is arranged to adjust the size of its coverage area based on the weighting value of the cell by dynamically changing the handover margin in relation to the surrounding cells, and the handover margin of the base station of the particular cell has a certain basic value and that the base station is arranged to adjust the margin with a correction factor depending on the amount of interference.

8. The system of claim 7, wherein the cellular radio system is arranged to calculate the weighting value for each cell depending on the amount of traffic of each cell.

9. The cellular radio system of claim 7, wherein the base station of the particular cell is arranged to independently adjust the handover margin between the particular cell and each surrounding cell.

10. The cellular radio system of claim 7, wherein connections interfered by a particular cell of neighbouring cells using at least partly the same frequency set as the particular cell are determined on the basis of the measurements of the subscriber terminals located in the neighbouring cells concerning the strongest neighbouring cells and on the basis of the common frequencies used by the neighbouring cells together with the particular cell and in that the correction factor of the handover margin depends on the quality measurements of the interfered connections of each surrounding cell.

* * * * *